Nov. 24, 1959 — H. C. LESLIE — 2,913,735
MOLDED WATER CLOSET SEAT AND COVER
Filed June 6, 1955 — 3 Sheets-Sheet 1

INVENTOR.
HOWARD C. LESLIE
ATTORNEYS

Nov. 24, 1959     H. C. LESLIE     2,913,735
MOLDED WATER CLOSET SEAT AND COVER
Filed June 6, 1955     3 Sheets-Sheet 2
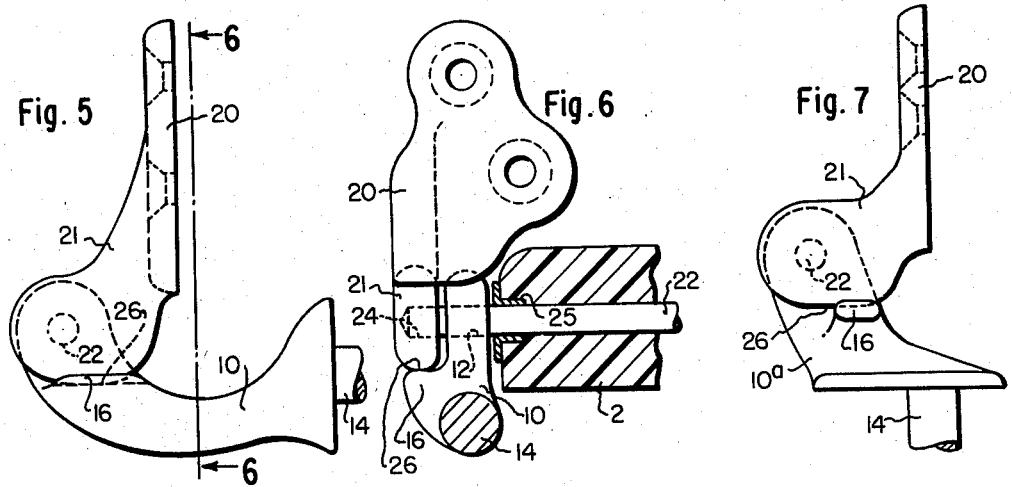
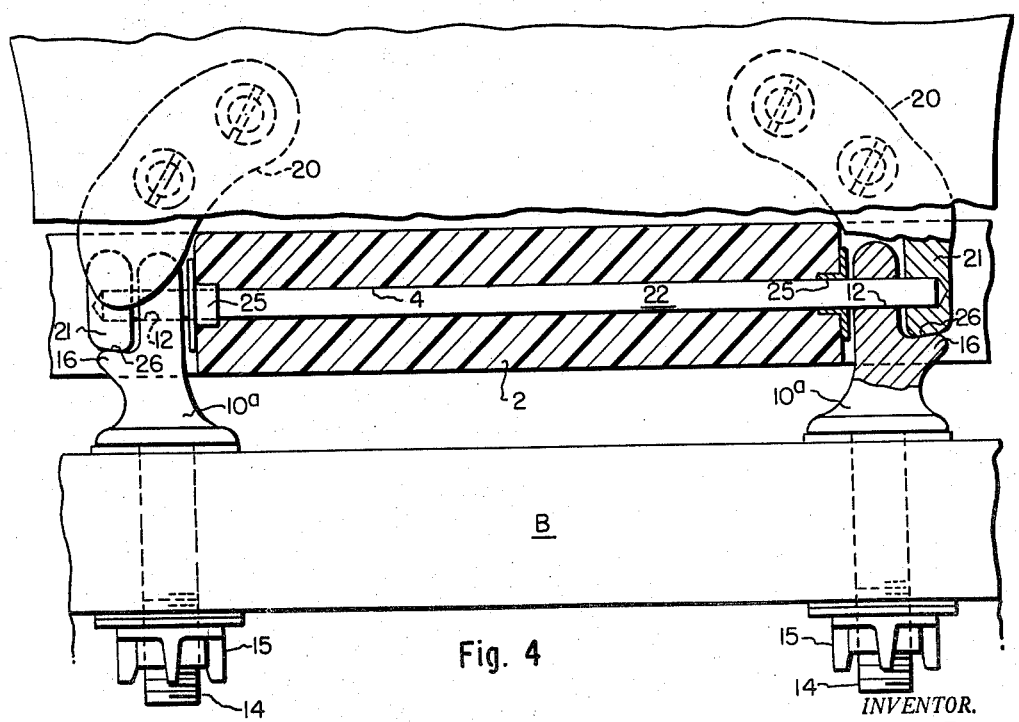
INVENTOR.
HOWARD C. LESLIE
BY
ATTORNEYS Nov. 24, 1959 H. C. LESLIE 2,913,735
MOLDED WATER CLOSET SEAT AND COVER
Filed June 6, 1955 3 Sheets-Sheet 3

*INVENTOR.*
HOWARD C. LESLIE
BY *Kenway Jenney*
*Witter & Hildreth*
ATTORNEYS

United States Patent Office 2,913,735
Patented Nov. 24, 1959

2,913,735
MOLDED WATER CLOSET SEAT AND COVER
Howard C. Leslie, Milton, Mass.
Application June 6, 1955, Serial No. 513,487
3 Claims. (Cl. 4—234)

Molded water closet seats with and without covers have been on the market for years, but they are subject to certain disadvantages which tend to impair their general acceptance. For example, those made from thermosetting resins containing appreciable amounts of filler are easily broken, particularly if designed with an extended back and hence must be adequately reinforced which adds substantially to the manufacturing costs. Those made from more durable materials such as a polystyrene and other polyvinyl resins, are usually designed either for use in conjunction with metallic hinge elements, or are formed with integral upstanding lugs which receive pintles carried by the supporting posts and present a rather unattractive appearance together with an undesirable seat action. Both types of constructions are difficult to clean and maintain in sanitary condition.

The principal objects of the present invention are to overcome the aforementioned difficulties and provide a water closet seat and cover having extended backs pivotally interconnected so as to turn on the same axis, and to provide a seat and cover of strong and durable construction which effectively conceals the hinge structure and presents a more attractive appearance together with a more desirable seat action.

Further objects are to provide an improved hinge construction which prevents the cover from normally contacting the tank or other object when swung to upstanding position, thereby avoiding marring or otherwise injuring the surface of the cover, and to provide a construction which not only holds the cover in upright position, but also the seat without creating undue stresses on the associated parts.

Another object is to provide a combination seat and cover which may be removed and replaced as a unit and wherein the cover may be readily removed from the seat and replaced, and also where the seat and cover may be readily assembled or disassembled as in the case of a seat and cover combination wherein the cover and side arms are molded integrally. Further objects relate to various features of construction and will be apparent from the consideration of the following description and the accompanying drawings, wherein:

Fig. 4 is an enlarged section through the extended back of the seat section shown in Fig. 3;

Fig. 5 is a side elevation of the type hinge shown in Figs. 1 and 2;

Fig. 6 is a section on the line 6—6 of Fig. 5;

Fig. 7 is a side elevation of the type hinge shown in Fig. 3;

In accordance with the present invention I provide a combination water closet seat and cover made from a molded plastic material, as by injection molding or compression molding, both the seat and cover being formed with extended backs. The extended back of the seat is provided with reinforcing means or the like which may have a projecting part or parts providing aligned pintles, or tubular parts for receiving the pintles.

The mounting for the seat and cover comprises spaced posts adapted to be secured either to the tank or bowl and adjacent to their upper ends these posts may be formed either with openings through which the pintles project, or they may carry oppositely projecting pintles, one of which projects into a suitable opening in the seat and the other in an opening in the support for the cover. Secured to or integral with the extended back portion of the cover are depending ears having their lower end portions contiguous to the outer sides of the posts and these ears are formed with recesses or openings which receive and conceal the ends of the pintles, thereby pivotally supporting the seat and cover on the same axis.

The posts and ears are preferably formed with integral abutments or shoulders effective to limit the swinging movement of the cover to an angle slightly greater than 90 degrees, and these shoulder portions are preferably formed with relatively flat surfaces declining inwardly so as to tend to urge the ears toward the posts, thus avoiding an objectionable outward camming action.

Where the seat is formed from an inherently strong and tough plastic, such as polystyrene or the like vinyl resin, little reinforcement is necessary and hence the extended back may be drilled to receive either a pintle or a sleeve carrying a retractable pintle, in either case the pintle and/or sleeve providing a reinforcement for the corner portions of the extended back. If the seat and cover are formed from a relatively brittle plastic such as a thermosetting resin, adequate reinforcement for at least their extended backs is necessary, and to this end means are employed which not only provide an adequate reinforcement, but also a part of a hinge mounting, as hereinafter illustrated.

Figure 1:
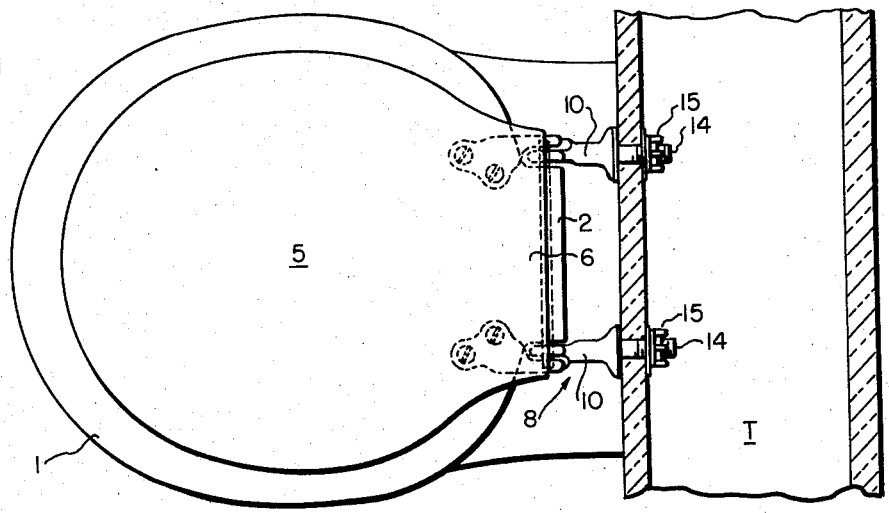
Fig. 1 is a top plan view of one embodiment of a combination seat and cover constructed in accordance with the present invention.
Figure 3:
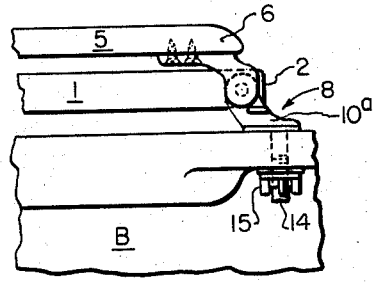
Fig. 3 is a fragmentary side elevation of a modification of the construction shown in Fig. 2.
Figure 2:
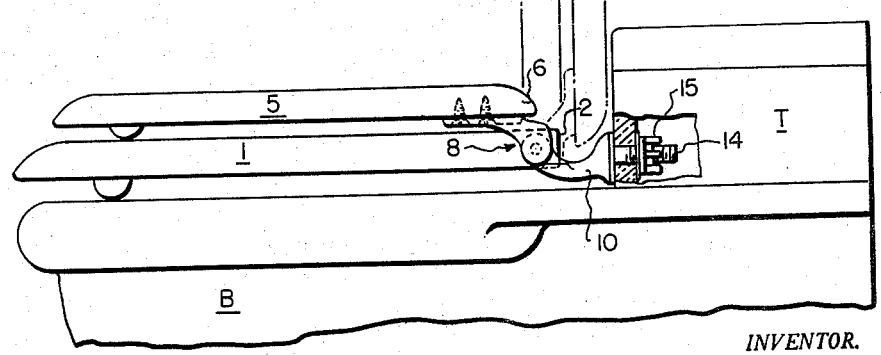
Fig. 2 is a side elevation, with parts in section, of the construction shown in Fig. 1.
Figure 12:
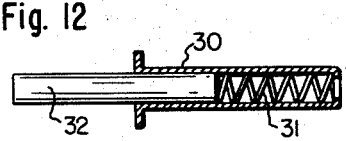
Fig. 12 is a detail of the pintle embodied in the construction shown in Figs. 8 to 10.
Figure 8:
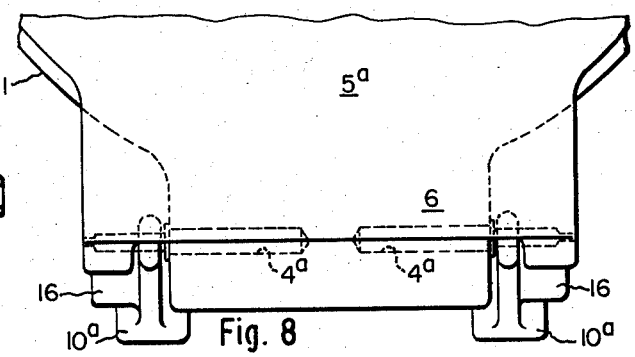
Fig. 8 is a top plan view of another embodiment of the invention.
Figure 10:
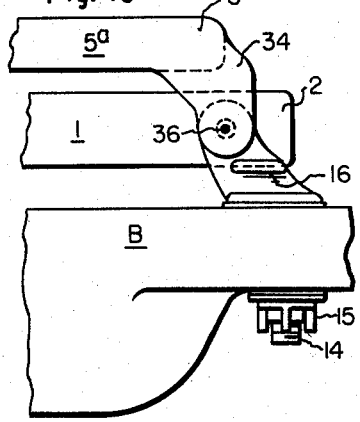
Fig. 10 is a fragmentary side elevation of the construction shown in Fig. 8.
Figure 9:
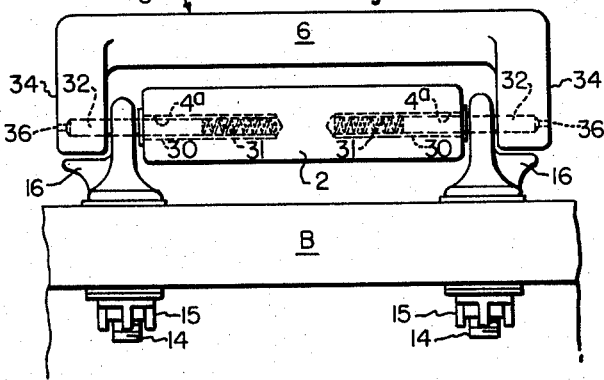
Fig. 9 is an end elevation of the embodiment shown in Fig. 8.

Referring to Figs. 1 to 7, the embodiments shown therein comprise a seat 1 formed from an injection molded plastic such as polystyrene and has an extended back 2 which is drilled transversely to provide a continuous bore 4 (Fig. 4). A cover 5 is likewise formed from an injection molded plastic and is formed with an extended back 6 of substantially greater width than that of the seat, but preferably of somewhat lesser depth, as shown in Figs. 1 to 3.

The seat and cover are supported by a hinge mounting 8 comprising either spaced posts 10 (Figs. 1 and 2) where they are to be anchored to the tank T or posts 10a (Fig. 3) where they are to be anchored to the rim of the bowl B. In either case the posts are formed with openings 12 (Figs. 5–7) adjacent to their upper ends and threaded extensions 14 at their opposite ends which extend through openings either in the tank T or the rim of the bowl B and receive nuts 15. Below the openings 12 are laterally projecting shoulders 16 which are preferably relatively flat and decline inwardly toward the outer face of the posts, as shown in Figs. 4 to 7. Ears 20 secured to the underside of the cover 5 have depending lobes 21 which are contiguous to the outer sides of the posts 10 or 10a, as the case may be.

Forced into the bore 4 of the back 2 is a rod 22 having its opposite ends projecting through the openings 12 in the posts into recesses 24 (Fig. 6) in the depending lobes 21 to provide pintles for pivotally supporting the seat and cover on the same axis. If desired, the rod 22 may be formed with a slight camber so as to fit tightly in the bore 4, and its opposite end portions may carry ferrules 25 (Fig. 4) which tightly fit the ends of the bore 4 to provide bearing surfaces and thus protect the finish at the points where the seat rubs against the posts.

The lobes 21 are formed with relatively flat surfaces 26 (Figs. 4–7) which incline outwardly and are engageable with the shoulders 16 of the posts to provide checks or stops limiting the swinging movement of the cover, relative to the seat, to an angle slightly more than 90 degrees, thus preventing the cover from contacting the tank when in upright position, as illustrated by the broken lines of Fig. 2. The inclination of the interengaging surfaces is merely sufficient to tend to urge the ears 20 inwardly toward the contiguous surfaces of the posts 10 or 10a and thus avoid an outward camming action which is objectionable since there is nothing to oppose outward movement of the ears other than the attaching screws which would soon become loosened.

It will be noted that with the design and construction herein shown the seat and cover turn on the same axis thus eliminating the cover riding up and down against the tank or other fixture which tends to wear or mark the softer cover finish, and also accidentally closing on one's hand when the seat is lowered. As illustrated in Figs. 1 and 2, the extended back of the cover conceals much of the hinge construction and when swung to open position it entirely uncovers the top of the seat, thus permitting easy cleaning.

The embodiments shown in Figs. 8 to 14 are, in principle, the same as the embodiments of Figs. 1 to 7 and the same or similar reference characters are applied to corresponding parts. In the embodiment of Figs. 8 to 10 and 12 the extended back 2 of the seat 1 is drilled to provide a pair of aligned transverse openings 4a which receive flanged sockets 30 (Fig. 12) in which are disposed coil springs 31 and retractable pintles 32 which project through the openings in the posts 10a.

The cover 5a is molded and formed with integral depending ears 34 having inwardly facing recesses which snugly receive the projecting ends of the pintles 32 so that the seat and cover are pivotally supported on the same axis. These recesses communicate with small openings 36 which extend to the outer faces of the extended back and the size of these openings is such as to received a brad or the like so that the pintles may be retracted against the action of the springs 31 to permit removal of the cover. This construction and arrangement of parts possesses the aforementioned advantages and it will be noted that the sockets 30 not only function as a holder for the retractable pintles, but also provide reinforcing elements for the extended back of the seat.

Figure 11:
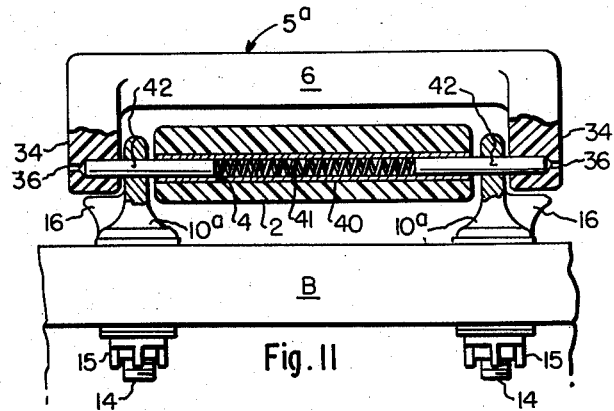
Fig. 11 is a section through the extended back of a modified form of seat section.

The embodiment shown in Fig. 11 may either be injection molded or compression molded, and in either case the extended back 2 of the seat is drilled to provide a single transverse opening 4, as in the embodiment of Figs. 1 to 7, but in place of the reinforcing pintle rod 22, there is provided an elongate sleeve 40 in which is disposed a coil spring 41 and a pair of pintles 42 which project through the openings in the posts 10a into the recesses in the depending ears 34 of the cover. The design and construction of the cover 5a, if injection molded, is the same as that of the cover in the previously described embodiment and is formed with depending ears 34 with recesses to receive the pintles and openings 36 communicating with the recesses.

It will be noted that the sleeve 40 not only provides a holder for the retractable pintles, but also a reinforcing element for the extended back 2 of the seat. Since the sleeve 40 extends from one edge of the back to the other it provides a reliable reinforcement particularly suitable for compression molded seats formed from thermosetting resins. If desired, the flanged sockets 30 (Fig. 12) may be substituted for the sleeve 40.

Figure 13:
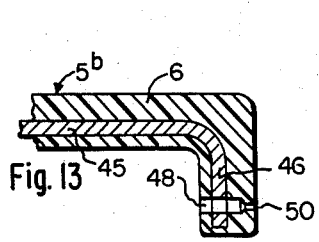
Fig. 13 is a modification of the cover shown in Figs. 8 to 11.

If the cover is to be compression molded from a thermosetting resin such as phenol formaldehyde, urea formaldehyde or melamine, which are relatively brittle as compared to the vinyl resins, then the construction shown in Fig. 13 may be adopted. In this construction the mold is designed so that the base 45 of an elongate U-shaped metal reinforcing element is embedded in the extended back 6 and a leg 46 is embedded in one of the depending ears 34. After release from the mold the ears are drilled to provide the recesses 48 which receive the pintles and the communicating openings 50, it being understood that the recesses pass through the legs 46 so that they carry the strain.

Figure 14:
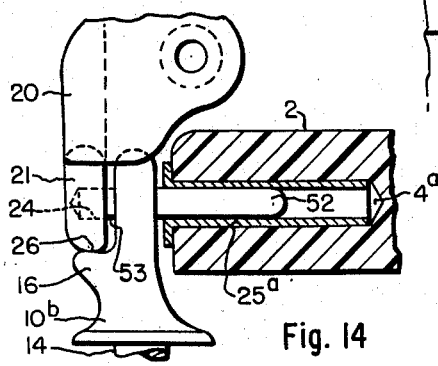
Fig. 14 is a view, similar to Fig. 6, but showing a modified form of post.

In each of the foregoing embodiments the pintles are carried by the seat, but if desired the pintles may be carried by or formed integral with the posts, as illustrated in Fig. 14. In this embodiment reinforcing sleeves or ferrules 25a fit into openings 4a drilled in the extended back 2 of the seat and pintles 52, 53 carried by or integral with the post 10b project into the opening in sleeve 25a and the opening 24 in lobe 21 of the support for the cover.

While I have shown and described several different embodiments of the invention it is to be understood that this disclosure is for the purpose of illustration and that various changes and modifications may be made without departing from the spirit and scope of the invention as set forth in the appended claims.

I claim:

1. For use with a mounting comprising laterally spaced posts, said posts having axially aligned, pintle-receiving openings adjacent and through their ends: a combination water closet seat and cover each made from a molded plastic material; the seat having an integral extended back of less width than the space between the mounting posts, retractable means projecting laterally from said extended back to provide pintles; a cover having an integral, continuous, extended back of greater width than the extended back of said seat, the extended back of the cover being spaced above the extended back of the seat and extending rearwardly over at least a portion of the posts, integral ears carried by the extended back of said cover and projecting downwardly in continuous relation to the outer sides of said posts, said ears being formed with openings to receive the ends of said pintles projecting outwardly beyond the posts for pivotally supporting said seat and cover on a common axis through said posts, reinforcing means in the back of the seat cover extending downwardly into the ear portions thereof, the outer ends of the pintles terminating within said ears of the cover, and small openings through the ears outwardly of and aligned with the ends of the pintles.

2. A combination water closet seat and cover according to claim 1 wherein portions of the reinforcing means associated with the ears have apertures registering with the pintle-receiving openings in said ears.

3. A combination water closet seat and cover according to claim 1 wherein the extended back of the seat has transversely extending tubular reinforcing means within which the pintles are received.

References Cited in the file of this patent

UNITED STATES PATENTS

| | | |
|---|---|---|
| 1,337,643 | De Guenther | Apr. 20, 1920 |
| 1,804,114 | Pudliner | May 5, 1931 |
| 2,064,628 | Raflovich | Dec. 15, 1936 |
| 2,120,493 | Groeniger | June 14, 1938 |
| 2,212,295 | Leslie | Aug. 20, 1940 |
| 2,283,893 | Leslie | May 19, 1942 |